United States Patent
Zylstra et al.

(10) Patent No.: US 10,647,196 B2
(45) Date of Patent: May 12, 2020

(54) AUXILIARY FUEL TANK CONTROL SYSTEMS AND METHODS OF USE

(71) Applicant: Z4 Manufacturing, Inc., Visalia, CA (US)

(72) Inventors: John Zylstra, Visalia, CA (US); Chad Pennebaker, San Leandro, CA (US)

(73) Assignee: Z4 Manufacturing, Inc., Visalia, CA (US)

( * ) Notice: Subject to any disclaimer, the term of this patent is extended or adjusted under 35 U.S.C. 154(b) by 0 days.

(21) Appl. No.: 16/049,642

(22) Filed: Jul. 30, 2018

(65) Prior Publication Data

US 2019/0047414 A1   Feb. 14, 2019

Related U.S. Application Data

(60) Provisional application No. 62/544,309, filed on Aug. 11, 2017.

(51) Int. Cl.
  *F02D 41/26* (2006.01)
  *B60K 15/077* (2006.01)
  *F02D 33/00* (2006.01)
  *F02M 37/00* (2006.01)
  *F02M 37/08* (2006.01)
  (Continued)

(52) U.S. Cl.
  CPC .......... *B60K 15/077* (2013.01); *F02D 33/006* (2013.01); *F02D 41/266* (2013.01); *F02M 37/0088* (2013.01); *F02M 37/08* (2013.01); *G05D 7/0676* (2013.01); *B60K 2015/0319* (2013.01); *B60K 2015/03138* (2013.01); *B60R 16/0231* (2013.01); *B62D 65/00* (2013.01); *F02D 41/003* (2013.01);
  (Continued)

(58) Field of Classification Search
  CPC ........ B60K 15/077; B60K 2015/03138; B60K 2015/0319; F02D 33/006; F02D 41/266; F02D 41/003; F02D 2400/22; F02M 37/0088; F02M 37/08; F02M 2037/085; G05D 7/0676; B60R 16/0231; B62D 65/00; H04W 84/12
  USPC ........................................................ 701/123
  See application file for complete search history.

(56) References Cited

U.S. PATENT DOCUMENTS 9,174,528 B2    11/2015  Anderson
2009/0044866 A1*  2/2009  Pearson ................ F02M 37/18
                                                                  137/87.01
(Continued)

OTHER PUBLICATIONS

The Fuelbox Auxiliary Tank System, installation instructions (Apr. 2017).
(Continued)

*Primary Examiner* — Gertrude Arthur Jeanglaude
(74) *Attorney, Agent, or Firm* — Mark D. Miller; Jared E. Christensen

(57) ABSTRACT

The present invention provides improved auxiliary fuel tank control systems and methods that avoid the need for locating, identifying, and tapping into a wire leading from the sending unit of the vehicle's primary fuel tank by connecting directly to a diagnostic port of the vehicle which is in communication with the output from the sending unit. Based on information received from the sending unit, embodiments of the invention may automatically cause fuel to be pumped from an auxiliary tank to the primary tank when the amount of fuel in the primary tank drops below a threshold.

21 Claims, 3 Drawing Sheets

(51) Int. Cl.
*G05D 7/06* (2006.01)
*H04W 84/12* (2009.01)
*B60K 15/03* (2006.01)
*B60R 16/023* (2006.01)
*B62D 65/00* (2006.01)
*F02D 41/00* (2006.01)

(52) U.S. Cl.
CPC ... *F02D 2400/22* (2013.01); *F02M 2037/085* (2013.01); *H04W 84/12* (2013.01)

(56) References Cited

U.S. PATENT DOCUMENTS

2016/0169121 A1* 6/2016 McCabe ............... F02C 7/236
  60/739
2016/0380287 A1* 12/2016 Kaneko ............ H01M 8/04253
  429/429

OTHER PUBLICATIONS

Transfer Flow's Trax II User's Guide and Reference for auxiliary fuel tank systems manufactured by Transfer Flow, Inc. (Jan. 2015).
Travel Trekker, installation instructions (Sep. 15, 2017).
Freedom Fill Auxiliary System, installation instructions (Sep. 1, 2017).

\* cited by examiner

AUXILIARY FUEL TANK CONTROL SYSTEMS AND METHODS OF USE

FIELD OF THE INVENTION

The present invention relates to systems and methods for automatically transferring fuel from an auxiliary fuel tank of a vehicle to a primary fuel tank, and specifically to systems and methods for automatically transferring fuel from an auxiliary tank when a vehicle engine control unit indicates that fuel in the primary fuel tank has reached a predetermined level.

BACKGROUND

Vehicles that are utilized to go off-road for sport and recreation, or utilized for work which requires long hours of driving, often require refueling in locations devoid of easily accessible fueling stations. Driving back to a fueling station in such situations can be difficult and time consuming, limiting the utility of the vehicle. One option for reducing trips to a fueling station is to increase the fuel capacity of the vehicle by installing an auxiliary fuel system.

An auxiliary fuel system must meet certain standards in order to prevent voiding vehicle manufacturer warrantees and comply with EPA and DOT regulations. An efficient way to meet such standards and regulations is to avoid drilling into the primary fuel tank or tapping into downstream fuel transfer lines. This can be accomplished by transferring fuel into the primary fuel system upstream of the primary fuel tank. However, this setup requires the auxiliary fuel system to monitor the fuel level in the primary fuel tank in order to determine when to start transferring fuel (e.g., when the level of fuel in the primary tank reaches a certain point such as, without limitation, ¼ capacity), and when to stop transferring fuel (e.g., when the primary fuel tank is substantially full, and/or when the auxiliary tank is empty).

Existing automatic fuel transfer systems include an auxiliary fuel tank that is installed on a vehicle, a pump, and a controller that monitors the fuel levels of the primary fuel tank and auxiliary fuel tank and controls the pump. When the controller detects that the primary fuel tank is low, it automatically causes fuel to be pumped from the auxiliary tank into the primary tank. In order to detect when the primary tank is low, existing systems require tapping into a wire leading from a sensor in the fuel tank (the sending unit) which monitors the level of fuel in the primary tank. The information from this sensor (ordinarily a voltage provided from the sending unit) is used by the vehicle fuel gauge to display the current level of fuel in the primary tank. However, this system is not ideal as different makes and models of vehicles use different sending units which provide different voltages to different fuel gauges, so each time an existing controller is installed on a vehicle, it must be set up to correspond to the voltage range used by that particular vehicle. It can also be challenging to identify and tap into the correct wire leading from the primary fuel tank sending unit each time a controller is installed, and to connect that wire, which is in the engine compartment, to the auxiliary fuel controller unit, which is preferably located in the cabin of the vehicle. This can be a tedious and time-consuming process, often requiring trial and error to make sure that the correct wire has been tapped into, and may require drilling through the wall between the cabin and the engine compartment.

It is therefore desirable to provide auxiliary fuel tank control systems and methods of use that monitor the levels of fuel in a vehicle's primary fuel tank and auxiliary fuel tank, and that may be installed without having to identify and tap into a wire leading from the sending unit of the primary fuel tank, thereby avoiding guesswork and assuring proper installation and operation of the system.

SUMMARY

The present invention provides improved auxiliary fuel tank control systems and methods that avoid the need for locating, identifying, and tapping into a wire leading from the sending unit of the vehicle's primary fuel tank by connecting directly to a vehicle's engine control unit via an OBD-II type diagnostic port. OBD-II is an on-board diagnostics standard that has been adopted and used on a wide variety of cars and trucks. OBD-II provides access to numerous data from the engine control unit for diagnostic and other purposes, and includes an output leading from the fuel level sending unit in the primary fuel tank of the vehicle. The systems and methods of the present invention offer significant advancements over existing systems which require identifying and tapping into a sending unit wire in the engine compartment, and then programming a fuel controller based on the sending unit voltage which is dependent upon the particular make and model of the vehicle. The improved auxiliary fuel control systems and methods of the present invention avoid the need to splice into the factory wiring harness, and the hassle of locating the correct line from the sending unit of the primary fuel tank. In addition, because of the standardized data from the engine control unit, the improved auxiliary fuel control systems of the present invention can be used on multiple vehicles without the need to be re-programmed for each vehicle make and model.

Auxiliary fuel tank control systems of the present invention include an electronic controller having a power supply, the controller being in communication with the fuel level sending unit of the primary fuel tank, in communication with a fuel sensor in the auxiliary tank, and in communication with a pump connected to an auxiliary fuel tank; in some embodiments a pump relay circuit is also provided. The controller may have a display (e.g. a gauge, or one or more LED lights) showing the level of fuel in the auxiliary tank, an indicator (e.g. a light) showing when the pump is operating, and an override switch to turn the pump on. In most embodiments, the communication link with the sending unit of the primary fuel tank comprises a connector to the vehicle's diagnostic system (e.g., an OBD-II connector) for communication with the engine control unit, with the controller being operable to receive fuel level information from the sending unit via the engine control unit and the communication link.

A method for installing an auxiliary fuel control system of the present invention may include the steps of: mounting an electronic controller in the cabin of a vehicle in a location visible to a driver of the vehicle; putting the controller in electronic communication with a fuel pump relay of an auxiliary fuel tank; putting the controller in communication with a fuel sensor of the auxiliary fuel tank; connecting the controller to a diagnostic port of the vehicle (e.g., via an OBD-II connector) which includes a communication link to the primary vehicle fuel tank sending unit; and connecting the controller to a power source.

Embodiments of auxiliary fuel tank control systems of the present invention may be operable to connect to a fuse port of the vehicle and receive power when the vehicle ignition is turned to the on position, receive an auxiliary fuel signal from the auxiliary fuel tank, display the fuel level of the auxiliary fuel tank, receive information from the primary fuel tank sending unit through the vehicle's engine control unit, determine when the primary fuel tank reaches a minimum threshold (e.g., ¼ capacity), send a fuel transfer signal to the fuel pump (which may be via relay) when the primary fuel tank reaches the minimum threshold, indicate that fuel transfer is occurring, determine when either the primary fuel tank reaches a maximum threshold (e.g., ¾ capacity) based on the primary fuel signal, or the auxiliary fuel tank reaches a minimum threshold (e.g., substantially empty) based on the auxiliary fuel signal, and send a stop signal to the fuel pump or fuel pump relay when either condition occurs. Embodiments of the auxiliary fuel tank control systems of the present invention may also have an option to manually cause the auxiliary fuel pump to transfer fuel to the primary tank (e.g., via a manual transfer switch), which is operable to transfer fuel unless or until one of the following conditions occur: the operator cancels the manual transfer, a predetermined period has passed (e.g., four minutes), the primary fuel tank reaches the maximum threshold, or the auxiliary fuel tank reaches the minimum threshold.

Embodiments of auxiliary fuel tank control systems of the present invention may include a housing for supporting a central processing unit ("CPU"), an auxiliary fuel display, and a transfer indicator. In some embodiments, the automatic fuel controller may further comprise a switch for manually transferring fuel from the auxiliary fuel tank to the primary fuel tank.

In some embodiments, the CPU may be in electronic communication with a sending unit and a fuel pump relay of an auxiliary fuel tank, and with the output from the sending unit of the primary vehicle fuel tank via an engine control unit of the vehicle, the CPU being in electronic communication with the engine control unit via an OBD-II or other diagnostic connector in the cabin of the vehicle. In some embodiments, the automatic fuel controller may utilize ISO 15765 Can and SAE J1850 protocols, which include a standard data format for receiving and interpreting the information from the engine control unit.

In some embodiments, the CPU may be in electronic communication with the sending unit, fuel pump relay, and the diagnostic (OBD-II) connector via wires. In other embodiments, the CPU may be in wireless communication with the sending unit, fuel pump relay and the diagnostic (OBD-II) connector. In yet other embodiments, the CPU may be in wireless communication with some components, and in wired communication with other components. In some embodiments, the wireless connection may comprise at least one of a Wi-Fi connection, a Bluetooth connection, an RF connection, a WLAN connection, and/or another similar connection.

Embodiments of the OBD-II connector may comprise a standard male OBD-II connector complementary to a female OBD-II port of the vehicle, and in electronic communication with the CPU via a wire. In other embodiments, the OBD-II connector may comprise a male Wi-Fi OBD-II interface module, and the automatic fuel controller may comprise a USB port for connecting a Wi-Fi USB interface module for wirelessly communicating with the Wi-Fi OBD-II interface module. It is to be appreciated that different male/female connectors and different wireless links or devices may be used as alternatives or in different combinations to provide communication between the controllers of the present invention and the diagnostic port of the vehicle engine control system.

It is therefore an objective of the present invention to provide auxiliary fuel tank control systems which can avoid the need to splice into the factory wiring harness and the hassle of locating the correct line from the sending unit of the primary fuel tank.

It is a further objective of the present invention to provide a plug-and-play type auxiliary fuel tank control system which can be installed on different vehicles without the need to program the system for the particular make and model of the vehicle.

It is a further objective of the present invention to provide improved auxiliary fuel tank control systems which comply with DOT and EPA regulations and meet standards to prevent voiding vehicle manufacturer warrantees.

Additional aspects and objects of the invention will be apparent from the detailed descriptions and the claims herein.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Figure 1:
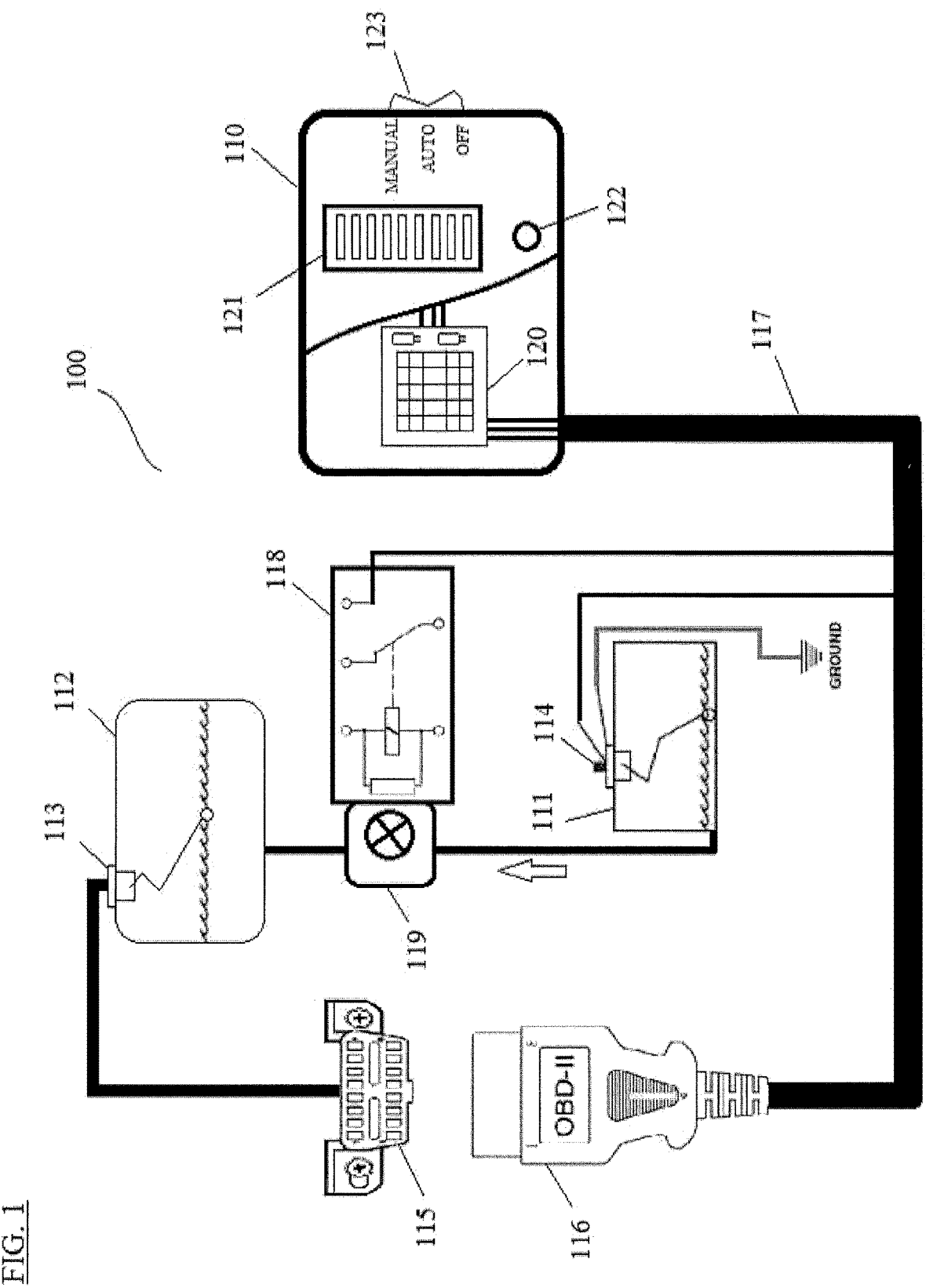
FIG. 1 shows a schematic view of an auxiliary fuel controller system, according to an embodiment of the present invention.
Figure 2:
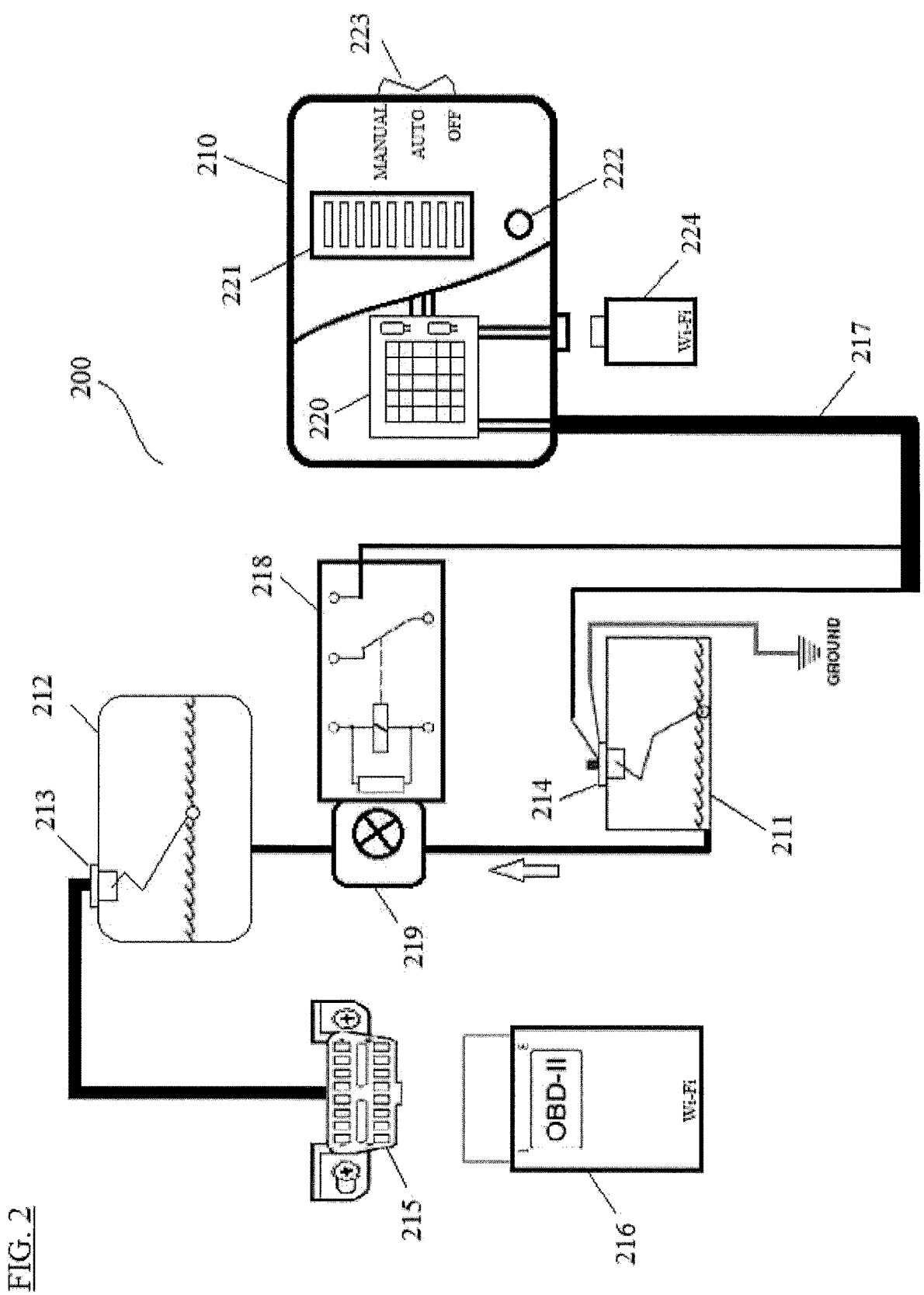
FIG. 2 shows a schematic view of an auxiliary fuel controller system, according to an embodiment of the present invention.
Figure 3:
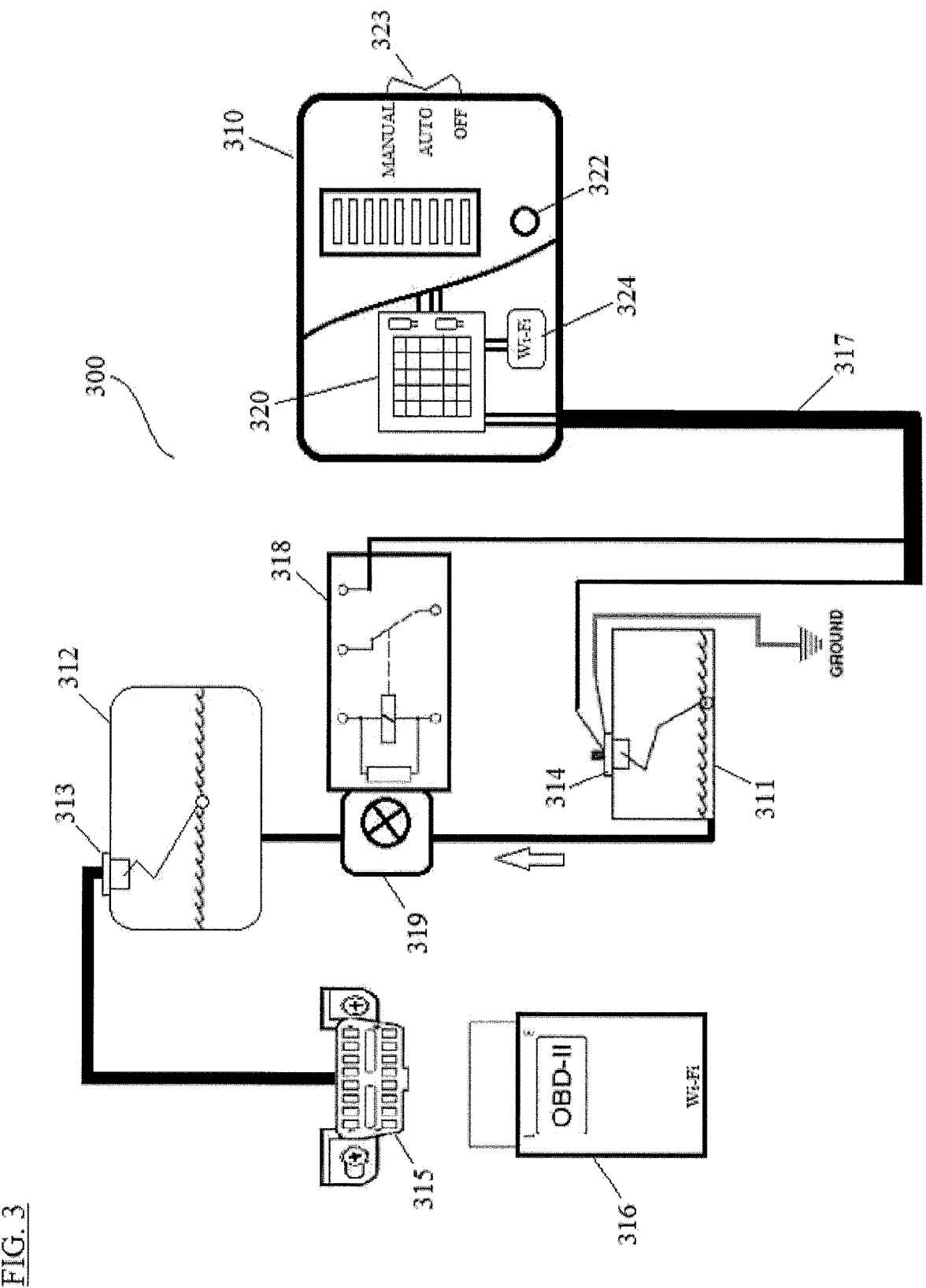
FIG. 3 shows a schematic view of an auxiliary fuel controller system, according to an embodiment of the present invention.

Referring to the drawings, wherein like reference characters designate like or corresponding parts throughout the several views, and referring particularly to FIGS. 1-3, it is seen that the present invention includes an auxiliary fuel tank that is installed on a vehicle, and a controller that monitors the fuel level in the primary fuel tank of the vehicle such that when the controller detects that the primary fuel tank is low, it automatically causes fuel to be pumped from the auxiliary tank into the primary tank.

Without limiting the invention, FIG. 1 shows an exemplary auxiliary fuel controller system 100, according to one embodiment of the present invention. The auxiliary fuel controller system 100 may comprise a controller 110 that monitors the fuel level in a primary tank 112 of a vehicle, a connector 116 for connecting to a diagnostic port 115 which is in communication with a sending unit 113 located in the primary fuel tank 112 for determining the fuel level in the tank 112, and a cable 117 for allowing electronic communication between the controller 110, the connector 116, an auxiliary fuel tank 111, and a fuel pump relay 118.

In order to detect when the primary tank 112 is low, a controller 110 receives information from a sending unit 113 found in the primary fuel tank 112. The sending unit 113 transmits this information (ordinarily in the form of a voltage, or other signal) that is used by the vehicle fuel gauge to display the current level of fuel in the primary tank 112. This information is also available via a diagnostic port 115 found on many late model vehicles. In some embodiments of the invention, a cable 117 may be provided between the controller 110 and the diagnostic port 115, the cable 117 having a connector 116 which mates with the diagnostic port 115. Information from the sending unit 113 regarding the fuel level in the primary tank 112 is transmitted via the diagnostic port 115 and connector 116 through the cable 117 to the controller 110, the controller 110 thereby monitoring the fuel level in the primary tank 112. Using this information, when the controller 110 detects that the primary tank 112 is has reached a minimum threshold, it may automatically activate a fuel pump relay 118, the relay 118 causing a fuel pump 119 to pump fuel from the auxiliary tank 111 into the primary tank 112.

Embodiments of the controller 110 may comprise a central processing unit 120 ("CPU"), the CPU 120 being in connection with a display 121 (e.g. one or more LED lights, a gauge, etc.) showing the level of fuel in the auxiliary tank 111, an indicator 122 (e.g. a light) that is activated when the pump 119 is operating, and a manual transfer switch 123 for manually transferring fuel from the auxiliary tank 111 to the primary tank, or turning the system 100 off. The CPU 120 may be in electronic communication with a sending unit 114 of the auxiliary tank 111, the fuel pump relay 118, and the output from the sending unit 113 of the primary tank 112 via the OBD-II connector 116 and diagnostic port 115 in the cabin of the vehicle via the cable 117.

Without limiting the invention, FIG. 2 shows an auxiliary fuel controller system 200, according to another embodiment of the present invention. The auxiliary fuel system of this embodiment 200 may comprise a controller 210 that wirelessly monitors the fuel level in a primary tank 212 of a vehicle having a sending unit 213. A wireless connector 216 may be connected to the diagnostic port 215 in the cabin of the vehicle in order to place it in communication with sending unit 213 in order to determine the fuel level in the primary tank 212. The wireless connector 216 may be in wireless communication with a wireless interface module 224 plugged into the controller 210. A cable 217 may allow for electronic communication between the controller 210, a sending unit 214 of an auxiliary fuel tank 211, and a fuel pump relay 218 which controls a fuel pump 219 for transferring fuel from the auxiliary fuel tank 211 to the primary fuel tank 212.

Embodiments of the controller 210 of the embodiment of FIG. 2 may comprise a CPU 220, a display 221 for displaying the fuel level in the auxiliary tank 211, an indicator 222 that is activated when a fuel pump 219 is operating, and a manual transfer switch 223 for manually transferring fuel from the auxiliary tank 211 to the primary tank 212, or turning the system 200 off. The CPU 220 may be in wireless communication with the diagnostic (OBD-II) wireless connector 216 via the wireless interface module 224. In alternative embodiments, the wireless connection between the wireless interface module 224 and the wireless connector 216 may comprise at least one of a Wi-Fi connection, a Bluetooth connection, an RF connection, a WLAN connection, and combinations thereof.

Without limiting the invention, FIG. 3 shows another auxiliary fuel controller system 300, according to a different embodiment of the present invention. The auxiliary fuel system of this embodiment 300 may comprise a controller 310 that wirelessly monitors the fuel level in a primary tank 312 of a vehicle having a sending unit 313. A wireless connector 316 may be placed in communication with the sending unit 313 via a diagnostic port 315 in the cabin of the vehicle in order to determine the fuel level in the primary tank 312. The wireless connector 316 may be in wireless communication with an integrated wireless module 324 plugged into the controller 310. A cable 317 may allow for electronic communication between the controller 310, a sending unit 314 of an auxiliary fuel tank 311, and a fuel pump relay 318 which controls a fuel pump 319 for transferring fuel from the auxiliary tank 311 to the primary tank 312.

Embodiments of the controller 310 of the embodiment of FIG. 3 may comprise a CPU 320, a display 321 for displaying the fuel level in the auxiliary tank 311, an indicator 322 that is activated when a fuel pump 319 is operating, and a manual transfer switch 323 for manually transferring fuel from the auxiliary tank 311 to the primary tank 312, or turning the system 300 off. The CPU 320 may be in wireless communication with the diagnostic (OBD-II) wireless connector 316 via the integrated wireless module 324. In alternative embodiments, the wireless connection between the integrated wireless module 324 and the wireless connector 316 may comprise at least one of a Wi-Fi connection, a Bluetooth connection, an RF connection, a WLAN connection, and/or combinations thereof.

In some implementations, the present invention provides an auxiliary fuel controller system comprising: a controller for receiving and monitoring a signal from a sending unit of a primary fuel tank of a vehicle, and automatically transferring fuel from an auxiliary tank to the primary tank when the primary fuel signal indicates a fuel level in the primary tank has reached a minimum threshold, and a communication link between the controller and a diagnostic port of the vehicle, the diagnostic port being in electronic communication with the sending unit. In some implementations, the communication link comprises a male OBD-II connector and the diagnostic port comprises a female OBD-II port. In other implementations, the communication link comprises a female OBD-II connector and the diagnostic port comprises a male OBD-II port. In some implementations, the controller and the diagnostic port are in electronic communication via a cable. In some implementations, the controller and the diagnostic port are in wireless electronic communication. In some implementations, the communication link comprises a male Wi-Fi OBD-II interface module, and the controller comprises a port for connecting a Wi-Fi interface module for wirelessly communicating with the Wi-Fi OBD-II interface module. In some implementations, the communication link comprises a male Wi-Fi OBD-II interface module, and the controller comprises an integrated Wi-Fi interface module for wirelessly communicating with the Wi-Fi OBD-II interface module. In some implementations, the wireless electronic communication comprises at least one of a Wi-Fi connection, a Bluetooth connection, an RF connection, a WLAN connection, or the like. In some implementations, the controller utilizes ISO 15765 Can and/or SAE J1850 protocols, which include a standard data format for receiving the primary fuel signal from the sending unit. In some implementations, the controller is in electronic communication with a fuel pump relay, the fuel pump relay being operable to control a fuel pump, the fuel pump being operable to pump fuel from the auxiliary tank to the primary tank. In some implementations, the controller is operable to receive an auxiliary fuel signal from a sending unit of the auxiliary tank, the controller being operable to stop transferring fuel from the auxiliary tank to the primary tank when either the primary tank reaches a maximum threshold or the auxiliary tank reaches a minimum auxiliary threshold. In some implementations, the controller comprises a manual transfer switch, the manual transfer switch being operable to cause the controller to manually transfer fuel from the auxiliary tank to the primary tank, or to turn the auxiliary fuel controller system off. In some implementations, the controller comprises a display for showing the level of fuel in the auxiliary tank, and an indicator that is activated when the fuel pump is operating.

In some implementations, the present invention provides an auxiliary fuel controller system, comprising: a controller operable to run ISO 15765 Can and/or SAE J1850 protocols and receive a primary fuel signal from a sending unit of a vehicle, and automatically send a fuel transfer signal when the primary fuel signal indicates a primary tank of the vehicle has reached a minimum threshold; an OBD-II connector in electronic communication with the controller, the OBD-II connector being operable to connect to an OBD-II diagnostic port in a cabin of the vehicle, the OBD-II diagnostic port being in electronic communication with the sending unit of the vehicle; and a fuel pump relay in electronic communication with the controller, the fuel pump relay being operable to receive the fuel transfer signal and control a fuel pump, the fuel pump being operable to transfer fuel from an auxiliary tank to the primary tank. In some implementations, the controller and the OBD-II connector are in wireless electronic communication. In some implementations, the wireless electronic communication comprises at least one of a Wi-Fi connection, a Bluetooth connection, an RF connection, a WLAN connection, or the like. In some implementations, the OBD-II connector comprises a male Wi-Fi OBD-II interface module, and the controller comprises a port for connecting a Wi-Fi interface module for wirelessly communicating with the Wi-Fi OBD-II interface module. In some implementations, the OBD-II connector comprises a male Wi-Fi OBD-II interface module, and the controller comprises an integrated Wi-Fi module for wirelessly communicating with the Wi-Fi OBD-II interface module. In some implementations, the controller comprises a manual transfer switch, the manual transfer switch being operable to cause the controller to manually transfer fuel from the auxiliary tank to the primary tank, or to turn the auxiliary fuel controller system off.

In some implementations the present invention provides a method for installing an auxiliary fuel controller system, comprising the steps of: mounting a controller in a cabin of the vehicle in a location visible to a driver of the vehicle; connecting the controller to a fuel pump relay; placing the controller in electronic communication with an auxiliary sending unit of the auxiliary tank by connecting the connector to the diagnostic port; and connecting the controller to a power source. In some implementations, the power source comprises a fuse port of the vehicle.

Embodiments of the present invention are designed to be plug-and-go units, and avoid the need to splice into the factory wiring harness and the hassle of locating the correct line from the fuel tank sending unit to pick up fuel level information. In addition, because of the standardized data from the fuel tank sending unit, the controllers of the present invention may be used on multiple vehicles, and need not necessarily be re-programmed for each vehicle make and model. OBD II is an on-board diagnostics standard that has been in use on a large variety of cars and trucks from approximately 1996 to the present. OBD-II provides access to numerous data from the engine control unit and offers a valuable source of information when troubleshooting problems inside a vehicle.

The present invention provides improved auxiliary fuel tank control systems and methods of installation and use. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An auxiliary fuel controller system comprising:
   a. a controller for receiving and monitoring information from a sending unit of a primary fuel tank of a vehicle, and automatically transferring fuel from an auxiliary tank to said primary tank when information from said sending unit indicates that a fuel level in said primary tank has reached a minimum threshold, and
   b. a communication link between said controller and a diagnostic port of said vehicle, said diagnostic port being in electronic communication with said sending unit.

2. The system of claim 1, wherein said communication link comprises a male OBD-II connector and said diagnostic port comprises a female OBD-II port.

3. The system of claim 2, wherein said controller and said diagnostic port are in electronic communication via a cable.

4. The system of claim 2, wherein said controller and said diagnostic port are in wireless electronic communication.

5. The system of claim 4, wherein said communication link comprises a male Wi-Fi OBD-II interface module, and said controller comprises a port for connecting a Wi-Fi interface module for wirelessly communicating with said Wi-Fi OBD-II interface module.

6. The system of claim 4, wherein said communication link comprises a male Wi-Fi OBD-II interface module, and said controller comprises an integrated Wi-Fi interface module for wirelessly communicating with said Wi-Fi OBD-II interface module.

7. The system of claim 4, wherein said wireless electronic communication is selected from the group consisting of a Wi-Fi connection, a Bluetooth connection, an RF connection, a WLAN connection, and combinations thereof.

8. The system of claim 1, wherein the communication between said diagnostic port and said sending unit is through an engine control unit, and wherein said engine control unit and said controller utilize one of the group of ISO 15765 Can protocol and SAE J1850 protocol, which include a standard data format for receiving said primary fuel signal from said sending unit.

9. The system of claim 1, wherein said controller is in electronic communication with a fuel pump relay, said fuel pump relay being operable to control a fuel pump, said fuel pump being operable to pump fuel from said auxiliary tank to said primary tank.

10. The system of claim 1, wherein said controller is operable to receive information from a sending unit of said auxiliary tank, said controller being operable to stop transferring fuel from said auxiliary tank to said primary tank when either said primary tank reaches a maximum threshold or said auxiliary tank reaches a minimum auxiliary threshold.

11. The system of claim 1, wherein said controller comprises a manual transfer switch, said manual transfer switch being operable to cause said controller to manually transfer fuel from said auxiliary tank to said primary tank, or to turn said auxiliary fuel controller system off.

12. The system of claim 1, wherein said controller comprises a display for showing the level of fuel in said auxiliary tank, and an indicator that is activated when said fuel pump is operating.

13. A method for installing the system of claim 1, comprising the steps of:
  a. mounting said controller in a cabin of said vehicle in a location visible to a driver of said vehicle;
  b. connecting said controller to a fuel pump relay;
  c. placing said controller in electronic communication with an auxiliary sending unit of said auxiliary tank by connecting said connector to a a diagnostic port of said vehicle; and
  d. connecting said controller to a power source.

14. The method of claim 13, wherein said power source comprises a fuse port of said vehicle.

15. An auxiliary fuel controller system, comprising:
  a. a controller operable to run ISO 15765 Can protocol or SAE J1850 protocol, and to receive information from a sending unit of a vehicle, and automatically send a fuel transfer signal when said information indicates a primary tank of said vehicle has reached a minimum threshold;
  b. an OBD-II connector in electronic communication with said controller, said OBD-II connector being operable to connect to an OBD-II diagnostic port in a cabin of said vehicle, said OBD-II diagnostic port being in electronic communication with said sending unit of said vehicle; and
  c. a fuel pump relay in electronic communication with said controller, said fuel pump relay being operable to receive said fuel transfer signal and control a fuel pump, said fuel pump being operable to transfer fuel from an auxiliary tank to said primary tank.

16. The system of claim 15, wherein said controller and said OBD-II connector are in wireless electronic communication.

17. The system of claim 16, wherein said wireless electronic communication is selected from the group consisting of a Wi-Fi connection, a Bluetooth connection, an RF connection, a WLAN connection, and combinations thereof.

18. The system of claim 16, wherein said OBD-II connector comprises a male Wi-Fi OBD-II interface module, and said controller comprises a port for connecting a Wi-Fi interface module for wirelessly communicating with said Wi-Fi OBD-II interface module.

19. The system of claim 16, wherein said OBD-II connector comprises a male Wi-Fi OBD-II interface module, and said controller comprises an integrated Wi-Fi module for wirelessly communicating with said Wi-Fi OBD-II interface module.

20. The system of claim 15, wherein said controller comprises a manual transfer switch, said manual transfer switch being operable to cause said controller to manually transfer fuel from said auxiliary tank to said primary tank, or to turn said auxiliary fuel controller system off.

21. An auxiliary fuel controller system comprising:
  a. a controller for receiving and monitoring information from a sending unit of a primary fuel tank of a vehicle,
  b. a communication link between said controller and a diagnostic port of said vehicle, said diagnostic port being in electronic communication with said sending unit, and
  c. a switch for manually activating a pump to transfer fuel from an auxiliary tank to said primary tank when information from said sending unit indicates that a fuel level in said primary tank has reached a minimum threshold.

* * * * *